(12) United States Patent
Currivan et al.

(10) Patent No.: US 7,104,534 B2
(45) Date of Patent: Sep. 12, 2006

(54) SYSTEM AND METHOD FOR DETECTING COLLISIONS IN A SHARED COMMUNICATIONS MEDIUM

(75) Inventors: Bruce J. Currivan, Irvine, CA (US); Jonathan S. Min, Buena Park, CA (US); Fang Lu, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 774 days.

(21) Appl. No.: 09/916,576

(22) Filed: Jul. 30, 2001

(65) Prior Publication Data

US 2003/0026283 A1 Feb. 6, 2003

Related U.S. Application Data

(60) Provisional application No. 60/296,446, filed on Jun. 8, 2001.

(51) Int. Cl.
*B23Q 3/08* (2006.01)

(52) U.S. Cl. ............................. 269/32; 269/228; 269/27
(58) Field of Classification Search ................... 269/32, 269/24, 27, 228, 201, 225, 286, 236
See application file for complete search history.

(56) References Cited

U.S. PATENT DOCUMENTS 5,657,326 A * 8/1997 Burns et al. ................. 370/349
5,719,869 A   2/1998 Ryoo et al.
5,940,400 A * 8/1999 Eastmond et al. .......... 370/445
6,178,161 B1 * 1/2001 Terry .......................... 370/276
2001/0055311 A1 * 12/2001 Trachewsky et al. ....... 370/445

FOREIGN PATENT DOCUMENTS

EP      1 069 554 A1    1/2001

OTHER PUBLICATIONS

Copy of European Search Report from European Patent Application No. 02254011.6, 3 pages, dated Sep. 19, 2003.

* cited by examiner

*Primary Examiner*—Hassan Kizou
*Assistant Examiner*—Jay P. Patel
(74) *Attorney, Agent, or Firm*—Sterne, Kessler, Goldstein & Fox PLLC

(57) ABSTRACT

A system for detecting collisions in a shared communications medium, such as a TDMA medium, includes a receive path adapted to generate a first intermediate signal, a second intermediate signal, and a data symbol sequence from an input signal. A preamble detection module generates a correlation metric from the first intermediate signal. A power measurement module generates a power indication signal from the second intermediate signal. A noise measurement module generates a noise indication signal from the second intermediate signal and the data symbol sequence. A processing module is adapted to characterize the input signal as a collision for certain values of correlation metric, power indication signal, and noise indication signal.

22 Claims, 10 Drawing Sheets

Contours showing preamble power gain or loss when two packets with a given amplitude offset and phase offset collide.

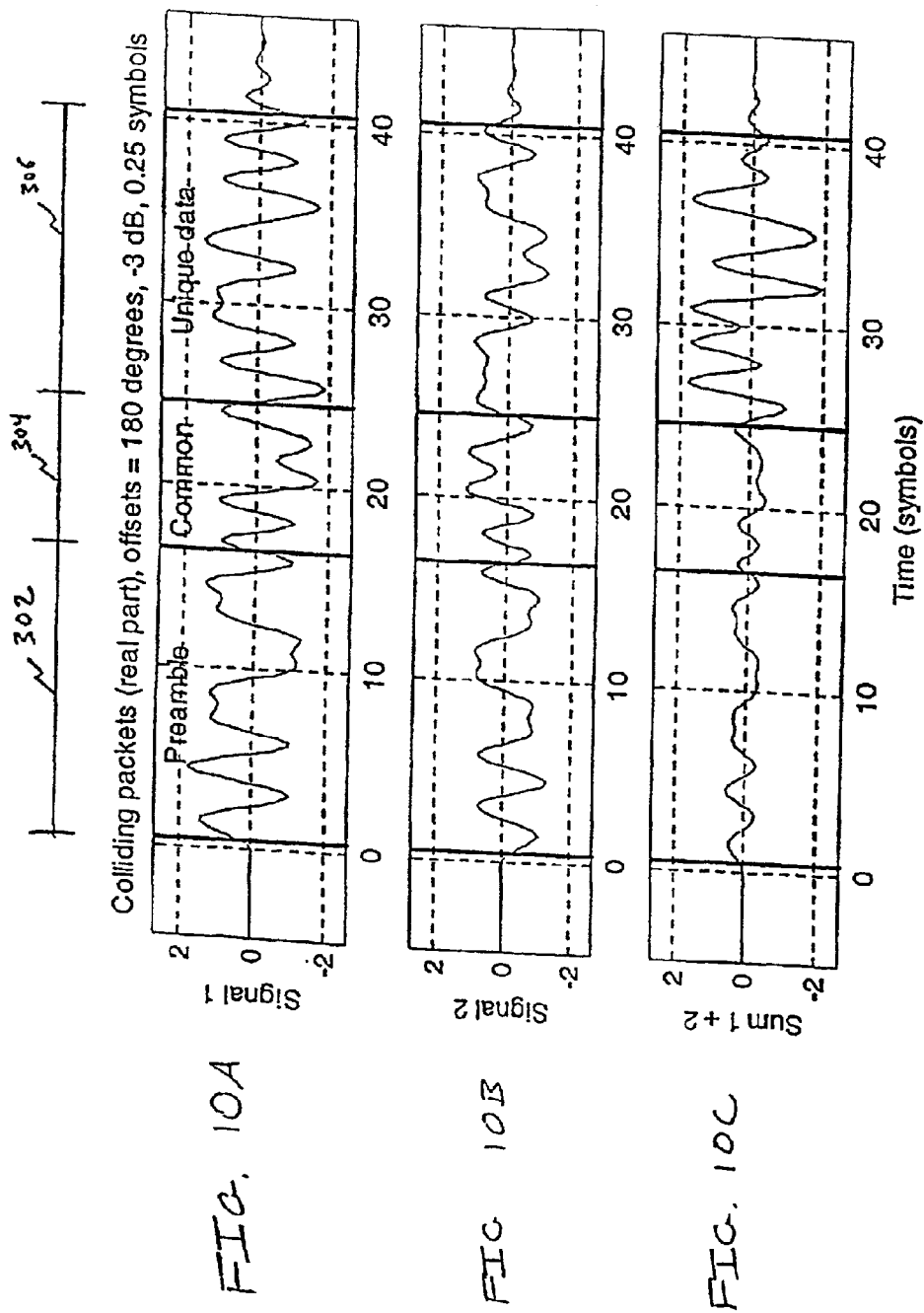

SYSTEM AND METHOD FOR DETECTING COLLISIONS IN A SHARED COMMUNICATIONS MEDIUM

CROSS-REFERENCE TO RELATED APPLICATION

This patent application claims priority to and is entitled to the benefit of Provisional Patent Application No. 60/296,446 (unofficial) filed Jun. 8, 2001 entitled "System and Method for Detecting Collisions in a Shared Communications Medium." This provisional application is incorporated herein by reference in its entirety.

BACKGROUND OF THE INVENTION

1. Field of the Invention

The present invention generally relates to a communications medium shared among several users. More particularly, the present invention relates to a method and system for detecting collisions in a shared communications medium.

2. Background Art

Communications systems that employ a shared communications medium may, in certain circumstances, permit two or more users to transmit information at the same time. For example, many time division multiple access (TDMA) communications systems designate one or more "contention time slots" within a TDMA frame structure. These contention time slots are designated for information transmissions from users according to contention-based communications protocols that allow users to transmit "at will."

These "at will" transmission protocols can cause multiple transmissions to overlap in time upon arrival at a designated receiver (for example, at the headend of a Data Over Cable Based Service Interface Specifications (DOCSIS) network). At the receiver, such overlapping transmissions combine to form a composite signal that is termed a collision. When a collision occurs, the multiple transmissions interfere with each other in a manner that can prevent the reception of a portion or all of the information in these transmissions.

Recovery from a collision requires the retransmission of information by users. Unfortunately, as collision rates increase, so does the retransmission rate. If the number of retransmissions becomes excessive, latencies associated with the transfer of information increase and communications capacity is wasted.

To reduce the amount of wasted capacity, many communications systems are able to adjust their parameters to optimize performance. For example, certain TDMA systems are able to dynamically adjust the number of allocated contention time slots to keep collision rates, often measured in collisions per second, within an acceptable range.

Thus, to effectively control collision rates, a communications system needs to accurately detect collisions. Conventional collision detection techniques do not provide great accuracy. For example, one such technique detects collisions based solely on received signal power. According to this technique, a collision is detected when one or more power measurements are above a certain level.

This power-based technique disadvantageously assumes that all colliding signals add in power and, as a consequence, result in a power level that is greater than a power level associated with a non-colliding signal. Unfortunately, phase and timing offsets between two or more colliding signals can result in a combined signal that does not have an increased power level. In fact, such offsets may also yield combined signals exhibiting decreased power levels. Furthermore, normal transmit power variations may corrupt such collision detection processes.

Thus, power-based collision detection approaches fail to detect a substantial number of collisions. Such failures result in collision rate overestimation or underestimation, which leads to ineffective contention slot allocation decisions.

Accordingly, what is needed is a technique to determine with relative certainty when a collision has occurred in the presence of amplitude, phase, and timing offsets.

BRIEF SUMMARY OF THE INVENTION

The present invention is directed to methods and systems for detecting collisions in a shared communications medium, such as a TDMA medium. A method of the present invention includes receiving a signal; calculating a correlation metric from the signal; measuring a signal noise content when the correlation metric is greater than a first threshold; and classifying the signal as a collision when the noise content is less than a second threshold.

Calculating the correlation metric may include correlating the signal with a second signal that corresponds to a preamble sequence. Measuring the signal noise content may include measuring a signal-to-noise ratio (SNR) of a data portion of the signal.

A further method of the present invention includes receiving a signal; generating a correlation metric from the signal, measuring a signal noise content when the correlation metric is greater than a first threshold, and measuring a signal power when the correlation metric is less than or equal to the first threshold. This method classifies the signal as a collision under certain circumstances. For example, the signal is classified as a collision when the measured signal power is greater than a second threshold, and when the measured signal noise content is less than a third threshold.

A system of the present invention includes a receive path adapted to generate a first intermediate signal (e.g., baseband signal), a second intermediate signal (e.g., a soft decision signal), and a data symbol sequence from an input signal. The system also includes a preamble detection module, a power measurement module, a SNR measurement module, and a processing module.

The preamble detection module is adapted to generate a correlation metric from the first intermediate signal. The power measurement module is adapted to generate a power indication signal from the second intermediate signal. The SNR measurement module is adapted to generate a signal to noise ratio (SNR) indication signal from the second intermediate signal and the data symbol sequence.

The processing module is adapted to characterize the input signal. For example, the processing module may characterize the input signal as a collision when the correlation metric is greater than a first threshold and the noise indication signal is less than a second threshold. In addition, the processing module may characterize the input signal as a collision when the correlation metric is less than or equal to a first threshold and the power indication signal is greater than a second threshold.

An advantage of the present invention is the determination of collisions with greater certainty.

BRIEF DESCRIPTION OF THE DRAWINGS/FIGURES

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

FIGS. 8–10 are graphs showing cases involving the collision of two exemplary signals.

DETAILED DESCRIPTION OF THE INVENTION

I. Operational Environment

Before describing the invention in detail, it is useful to describe an example environment in which the invention can be used. As the invention is directed to collision detection in a shared-medium communications system, it is particularly useful in a time division multiple access (TDMA) communications system. For example, the present invention may be implemented in an upstream communications channel of a cable based broadband communications system, such as a DOCSIS network.

Figure 1:
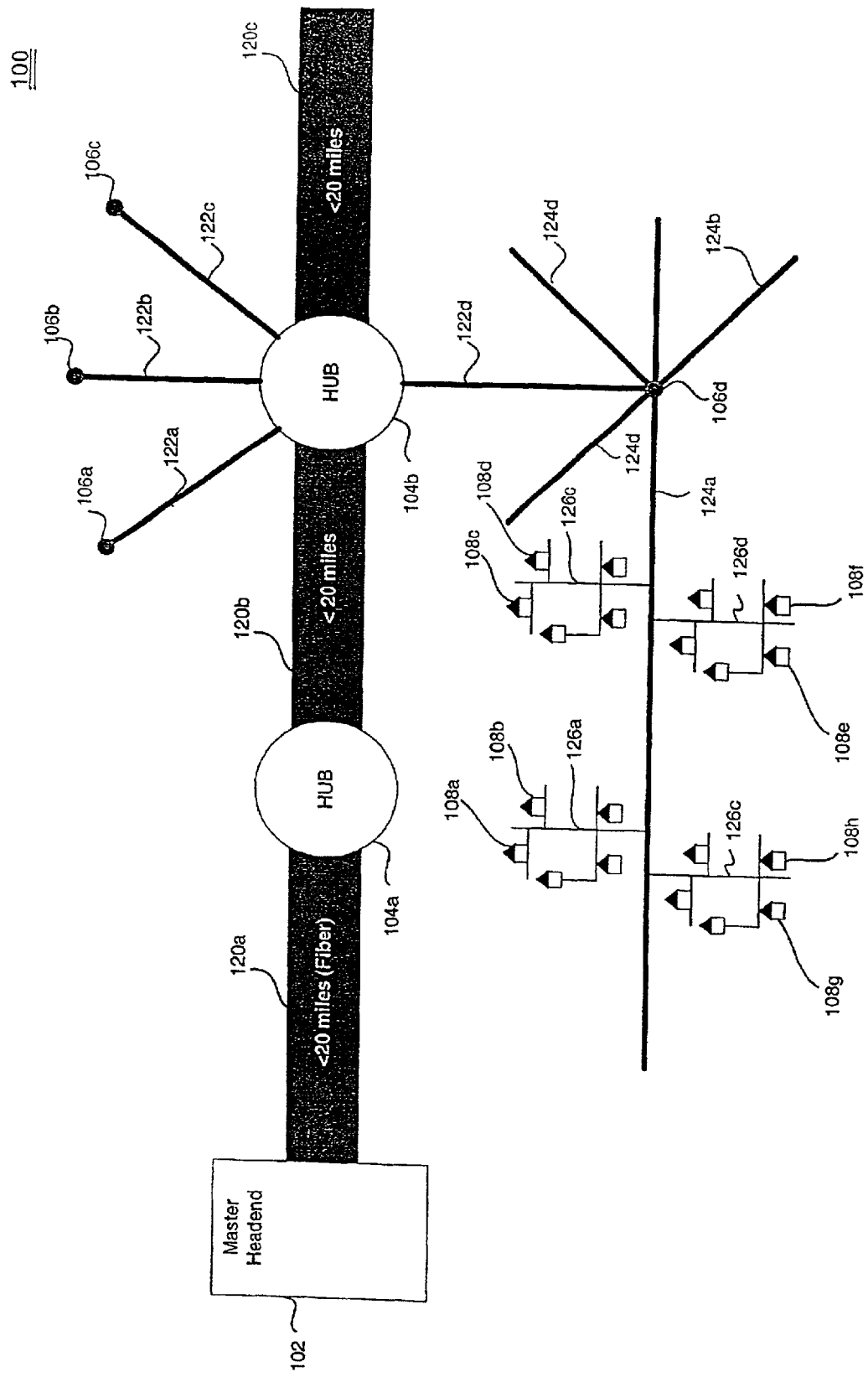
FIG. 1 is a block diagram of an exemplary cable based communications system.

FIG. 1 is a block diagram of an exemplary cable based communications system 100 that employs collision detection according to the present invention. Communications system 100 includes a master headend 102, hubs 104a–b, nodes 106a–d, and a plurality of subscribers 108. Subscribers 108 exchange bidirectional communications traffic with master headend 102 through various optical and electrical media. For instance, communications traffic is passed between master headend 102 and hub(s) 104 through optical media, while communications traffic is passed between nodes 106 and subscribers 108 through electrical media. These optical and electrical media are described below.

Fiber optic backbone segments 120a–c provide an interconnection between master headend 102 and hubs 104. As shown in FIG. 1, backbone segments 120a–c each have exemplary distances of twenty miles or less. However, distances greater than twenty miles are within the scope of the present invention.

Nodes 106 each provide an interface between optical communications media and electrical communications media. As shown in FIG. 1 fiber optic lines 122 establish connections between hubs 104 and nodes 106. For example, fiber optic line 122d connects hub 104b and node 106d. Also, nodes 106 are each coupled to one or more coaxial cables 124. Coaxial cables 124, in conjunction with coaxial cables 126, exchange electrical signals with subscribers 108. For example, coaxial cable 124a and coaxial cable 126d connects node 106d with subscribers 108e and 108f.

Traffic in communications system 100 includes upstream traffic and downstream traffic. Downstream traffic is received by subscribers 108 from system elements, such as master headend 102. In contrast, upstream traffic is originated by subscribers 108 and directed to system elements, such as master headend 102.

For coaxial cables 124, upstream and downstream traffic are each allocated to a particular frequency band. For example, upstream traffic may be allocated to a 5–42 MHz frequency band, while downstream traffic may be allocated to a 54–860 MHz frequency band. One or more frequency channels exist within these frequency bands that provide for the transmission of signals. These signals are modulated according to a digital modulation scheme, such as quadrature amplitude modulation (QAM) or quadrature phase shift keying (QPSK).

Multiple subscribers 108 share the electrical and optical communications media of communications system 100. For instance, in the context of coaxial cables 124 and 126, multiple subscribers 108 transmit signals across the same frequency channel in the same coaxial cable 124. To accommodate such frequency channel sharing, communications system 100 employs a multiple access technique, such as TDMA for upstream traffic.

TDMA is a transmission scheme that allows a number of subscribers 108 to transmit information across a single frequency channel without interference. This is enabled by allocating unique time slots to each subscriber 108. According to TDMA, subscribers 108 send upstream transmissions across a channel during one or more time slots that occur within a TDMA frame. Various types of time slots exist. Three examples are reservation slots, contention slots, and maintenance slots.

Reservation slots are slots assigned to subscribers 108 for the transmission of application information. Examples of application information include data traffic and information associated with telephony applications. Subscribers 108 are assigned reservation slots in response to upstream reservation requests that they transmit during contention slots.

Contention slots are used for the upstream transmission of reservation requests by subscribers 108. Reservation requests are subscriber 108 originated transmissions (also referred to herein as burst transmissions and packets) that request upstream bandwidth (such as one or more reservation slots) for the transmission of application information. Such reservation requests are received and processed by one of the system components, such as a node 106, hub(s) 104, and/or master headend 102. In response, this component includes a controller that transmits a downstream allocation command that indicates allocated upstream bandwidth to the requesting subscriber 108.

During contention slots, any number of subscribers 108 may transmit such requests at will. Consequently, multiple requests may interfere or "collide" with each other upon reception at system elements, such as nodes 106. Reservation requests are transmissions having multiple portions. These portions are described below with reference to FIG. 3.

Maintenance slots enable subscribers 108 to perform maintenance functions, such as ranging. Ranging is an operation that involves subscribers 108 each determining the propagation delays incurred in sending transmissions across shared media (e.g., coaxial cables 124 and 126) to a network element (e.g., nodes 106). This determination allows subscribers 108 to establish synchronization with the TDMA frame. In addition to enabling synchronization, maintenance slots afford subscribers 108 with the opportunity to perform amplitude and frequency adjustments.

Figure 2:
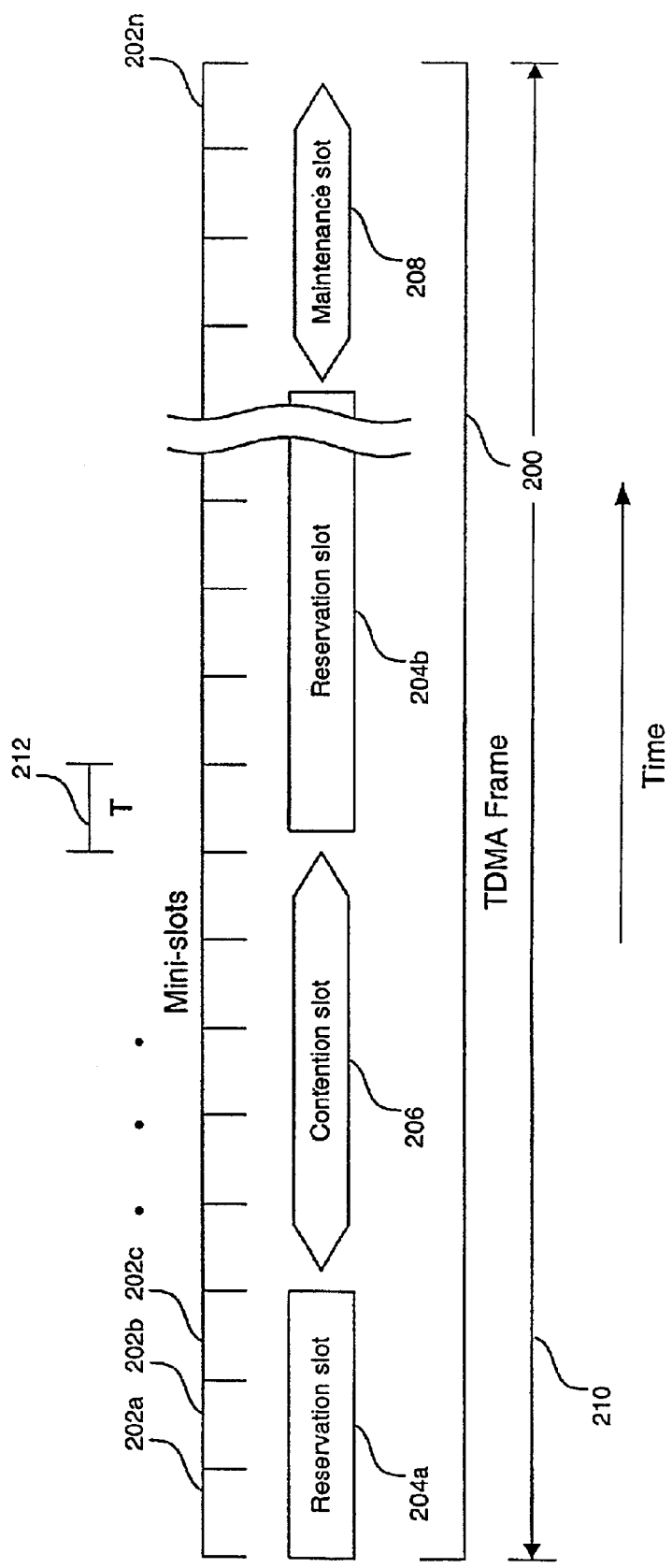
FIG. 2 is a diagram that illustrates an exemplary allocation of time slots within a TDMA frame.

FIG. 2 is a diagram that illustrates an exemplary allocation of time slots within a TDMA frame 200. As shown in FIG. 2, a TDMA frame 200 has a time duration 210 that is divided into a plurality of mini-slots 202. Each mini-slot 202 has a time duration 212 that enables the transmission of information. TDMA frame 200 may include reservation, contention, and/or ranging time slots that each have durations of one or more mini-slots 202. For instance, the exemplary time slot allocation of FIG. 2 shows two allocated reservation time slots 204a–b, an allocated contention time slot 206, and a maintenance time slot 208.

Figure 3:
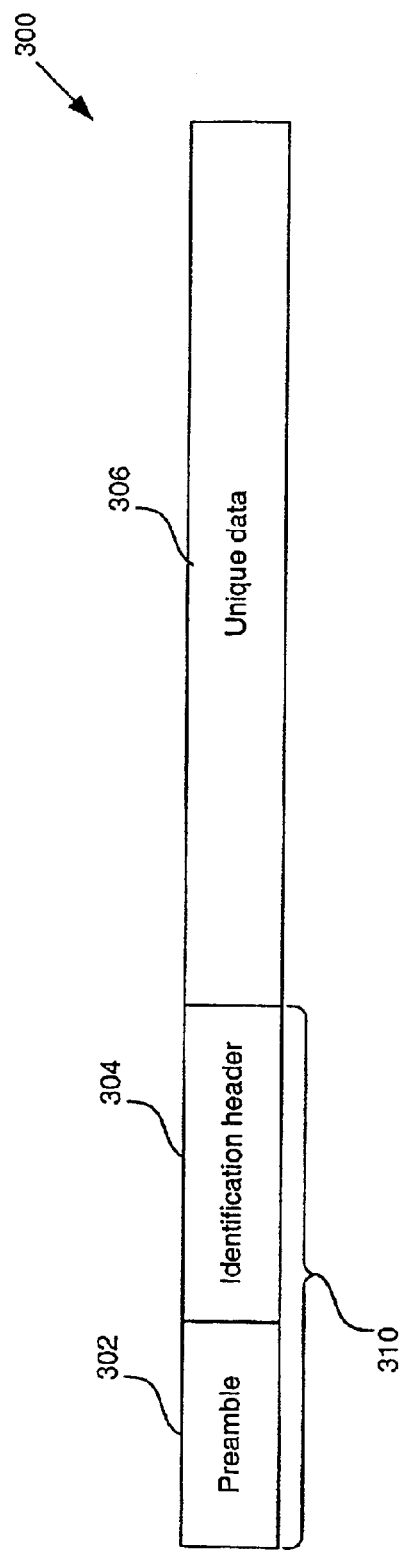
FIG. 3 is a diagram illustrating an exemplary reservation request.

In one embodiment, a reservation request is a packet of symbols, such as QPSK or QAM symbols, having multiple portions. FIG. 3 is a diagram illustrating an exemplary reservation request 300 having three portions totaling 40 symbols. As shown in FIG. 3, request 300 includes a preamble 302, an identification header 304, and a unique data portion 306.

For exemplary reservation request 300, preamble 302 is a predetermined 16 symbol sequence. Identification header 304 is an 8 symbol sequence that contains identification data, such as a medium access control (MAC) header. Unique data portion 306 includes 16 data symbols.

A standard symbol sequence 310 includes preamble 302 and identification header 304. Standard symbol sequence 310 is the same for all subscribers 108. In contrast to standard sequence 310, unique data portion 306 generally differs for each subscriber 108.

During a contention time slot, collisions between two or more reservation requests may occur. These collisions are caused by two or more reservation requests arriving simultaneously at a designated receiver such that portions (or even all) of these transmissions overlap in time. These overlapping portions add and interfere with each other.

The present invention takes advantage of the fact that colliding transmissions, such as colliding reservation requests 300, have some symbols in common (e.g., standard symbol sequence 310), and some symbols not in common (e.g., unique data portion 306).

II. Exemplary Receiver

Figure 4:
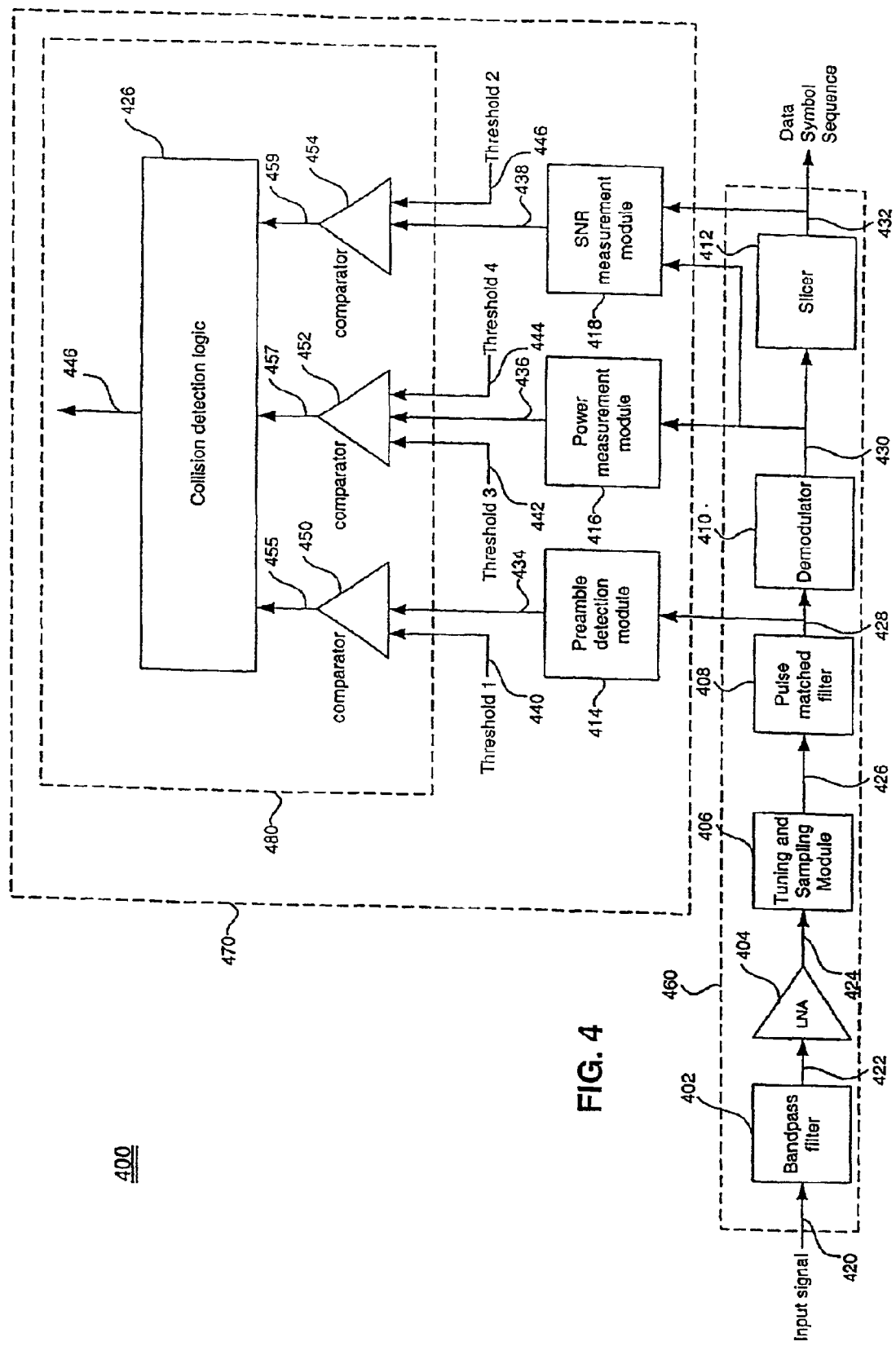
FIG. 4 is a block diagram of a receiver that detects collisions in a shared communications medium.

FIG. 4 is a block diagram of a receiver 400 that detects collisions in a shared communications medium that employs multiple access techniques, such as TDMA. Thus, receiver 400 may be included in communications system 100 elements, such as nodes 106, hubs 104, and/or master headend 102. Receiver 400 includes a demodulation path 460 and a collision detection module 470 that is coupled to demodulation path 460.

Demodulation path 460 receives an input signal 420, such as one or more TDMA burst transmissions, from a shared communications medium (not shown) and extracts an estimated data symbol sequence 432 from it. Input signal 420 is an information signal modulated according a modulation scheme, such as QPSK or QAM. In addition, input signal 420 is within a certain bandwidth.

Receive path 460 includes a bandpass filter 402 having a bandwidth that is greater than or equal to the bandwidth of input signal 420. Bandpass filter 402 filters input signal 420 into a filtered signal 422 that is sent to a low noise amplifier (LNA) 404.

LNA 404 amplifies filtered signal 422 to produce an amplified signal 424. Amplified signal 424 is sent to a tuning and sampling module 406, which downconverts amplified signal 424 into a baseband signal. In addition, tuning and sampling module 406 samples this baseband signal into a baseband pulse sequence 426.

A pulse matched filter 408 receives and filters baseband pulse sequence 426 to produce baseband signal 428. This filtering operation removes undesired spectral content from sequence 426. Pulse matched filter 408 may be a square root raised cosine filter. Baseband signal 428 is sent to a demodulator 410.

Demodulation module 410 demodulates baseband signal 428 according to a predetermined modulation scheme, such as QPSK or QAM. However, other modulation schemes are within the scope of the present invention. This demodulation process generates a soft decision signal 430.

Slicer 412 maps values of soft decision signal 430 into symbols. These symbols are included in data symbol sequence 432. This mapping function may be performed according to adaptive techniques to minimize demodulation errors.

Collision detection module 470 receives baseband signal 428, soft decision signal 430, and data symbol sequence 432. From these inputs, collision detection module 470 detects the presence of collisions in input signal 420. As shown in FIG. 4, collision detection module 470 includes a preamble detection module 414, a power measurement module 416, and a SNR measurement module 418.

Preamble detection module 414 receives baseband signal 428 and processes it to detect the presence of preambles. The presence of a preamble indicates the arrival of a TDMA burst transmission, such as a reservation request, as input signal 420. This processing involves correlating baseband signal 428 with a baseband preamble signal that corresponds to a TDMA preamble sequence.

Through this correlation process, preamble detection module 414 generates a correlation metric 434 having a value that indicates the strength of a preamble sequence. For example, a minimum value correlation metric 434 indicates the absence of a preamble in baseband signal 428. However, as the value of correlation metric 434 increases, so does the likelihood of a preamble existing in baseband signal 428.

Preamble detection module 414 functionality may be implemented with a processor, such as a digital signal processor. Alternatively, this functionality may be provided by matched filters.

By indicating the presence of preambles in baseband signal 428, preamble detection module 414 enables receiver 400 to synchronize itself so that it may receive and extract information from TDMA burst transmissions. In addition, through the generation of correlation metric 434, preamble detection module 414 provides information that enables the accurate detection of collisions in input signal 420. This utilization of correlation metric 434 is described below in greater detail with reference to FIG. 6.

Power measurement module 416 measures the power of portions of soft decision signal 430. For example, based on TDMA burst synchronization provided by preamble detection module 414, power measurement module 416 may measure the power in soft decision signal 430 during specific portions of a received burst transmission. For example, with reference to exemplary reservation request 300, power measurement module 416 may measure the power in unique data portion 306. Alternatively, power measurement module 416 may measure the power in both identification header 304 and unique data portion 306.

Power measurement module 416 may perform such power measurements through techniques that involve squaring and summing or averaging values of soft decision signal 430. Such techniques are well known to persons skilled in the relevant arts. Power measurement module 416 generates a power indication signal 436 that indicates the result of such power measurements.

SNR measurement module 418 characterizes the noise content of soft decision signal 430 and generates a SNR indication signal 438 that includes this characterization. This noise content may be measured during specific portions of a burst. For example, with reference to exemplary reservation request 300, SNR measurement module 418 may measure the SNR content in unique data portion 306. Alternatively, SNR measurement module 418 may measure the SNR in both identification header 304 and unique data portion 306.

SNR measurement module 418 receives soft decision signal 430 and estimated data symbol sequence 432. From these inputs, SNR measurement module 418 calculates a signal-to-noise ratio (SNR) of soft decision signal 430. SNR measurement module 418 outputs this SNR as SNR indication signal 438.

Figure 5:
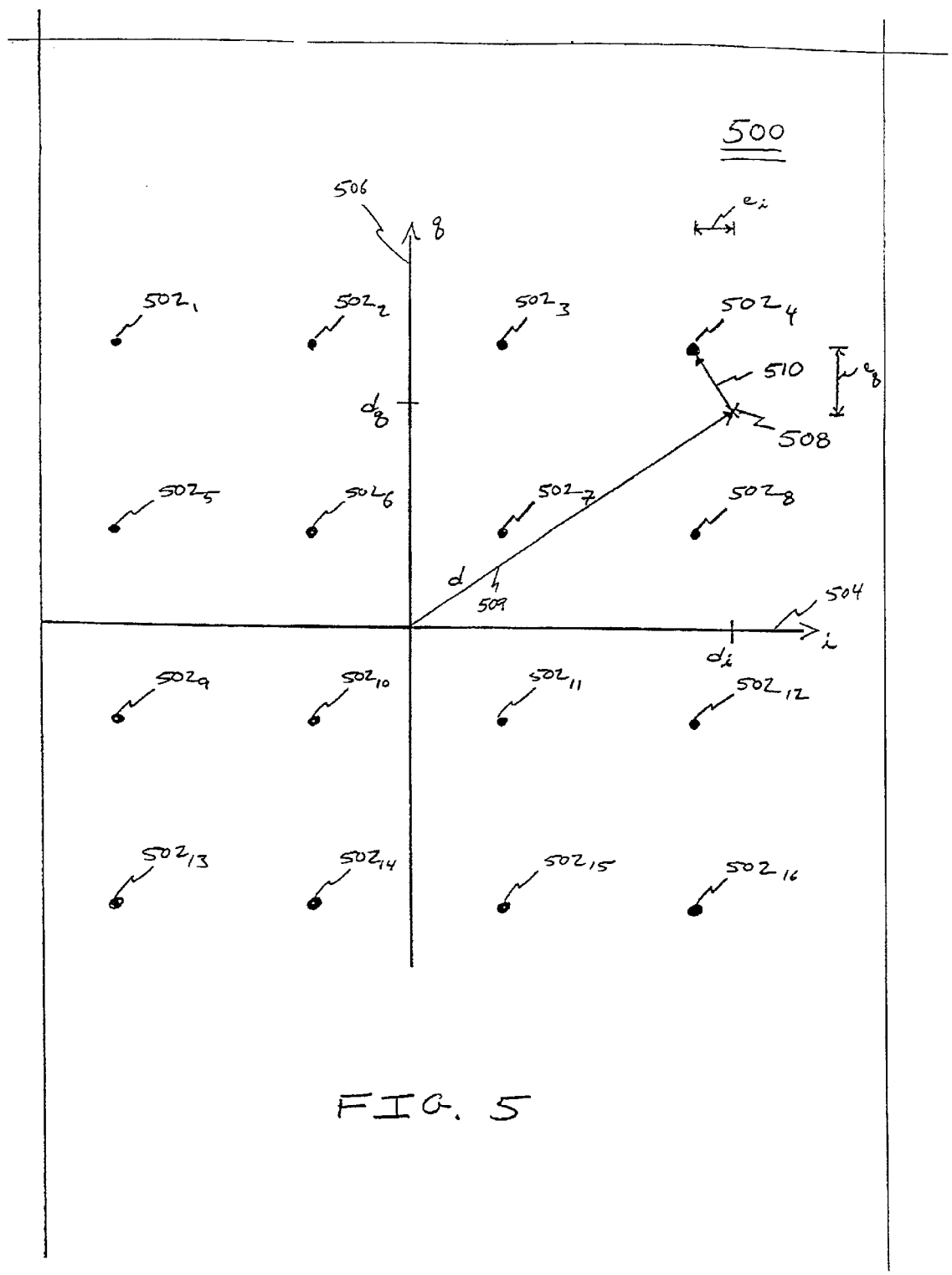
FIG. 5 is a diagram of an exemplary signal constellation.

To help illustrate an SNR calculation technique that SNR measurement module 418 may employ, an exemplary signal constellation 500 is illustrated in FIG. 5. Signal constellation 500 corresponds to a 16-QAM modulation scheme. As shown in FIG. 5, sixteen distinct symbols $502_1$–$502_{16}$ are distributed across a signal space defined by an in-phase (i) axis 504 and a quadrature (q) axis 506.

Constellation 500 illustrates a signal 508. Signal 508 is represented by a vector, d (shown as vector 509), which has an in-phase component, $d_i$, and a quadrature component $d_q$. As described above with reference to FIG. 3, slicer 412 maps values of soft decision signal 430 to corresponding symbols within data symbol sequence 432. However, such mappings reveal noise in soft decision signal 430.

An example of such noise is shown in FIG. 5, where signal 508 is separated from symbol $502_4$ by an error vector 510. Error vector 510 (also referred to herein as e) has an in-phase component $e_i$ and a quadrature component $e_q$.

An SNR can be calculated according to Equation (1), below.

$$SNR = \frac{S}{N} \quad (1)$$

In Equation (1), S represents the power of signal 508, and N represents the power of error vector 510. These values are expressed below in Equations (2) and (3).

$$S = \overline{|d|^2} = \overline{d_i^2} + \overline{d_q^2} \quad (2)$$

$$N = \overline{|e|^2} = \overline{e_i^2} + \overline{e_q^2} \quad (3)$$

SNR measurement module 418 performs SNR calculations according to Equations (1) through (3). In performing these calculations, d represents a symbol from data symbol sequence 432, while e represents the error vector between this symbol and a corresponding value of soft decision signal 430.

SNR measurement module 418 outputs result(s) of these SNR calculations as SNR indication signal 438. Alternatively, SNR measurement module 418 may output average SNR value(s) as SNR indication signal 438. Thus, SNR measurement module 418 may compute the average of a plurality of SNR calculation results that occur over a specific time window. Such averaging computations may employ various weighting schemes.

As shown in FIG. 4, collision detection module 470 includes a collision detection module 426 and comparators 450, 452, and 454. Comparators 450, 452, and 454 are each coupled to a collision detection logic module 426. In addition, comparator 450 is coupled to preamble detection module 414, comparator 452 is coupled to power measurement module 416, and comparator 454 is coupled to SNR measurement module 418.

Comparator 450 receives correlation metric 434 and a threshold signal 440 having a threshold value $T_1$. Comparator 450 compares these inputs and generates an output signal 455 that indicates the result of this comparison. Output signal 455 may take on distinct values. A first of these values indicates that correlation metric 434 is greater than $T_1$. This first value is referred to herein as "TRUE" since it signifies the detection of a preamble. A second of these values indicates that correlation metric 434 is less than or equal to $T_1$. This second value is referred to herein as "FALSE" since it signifies the absence of a preamble.

Comparator 452 receives power indication signal 436, a threshold signal 442 having a threshold value $T_3$, and a threshold signal 444 having a threshold value $T_4$. $T_4$ is greater than $T_3$. Comparator 452 compares these inputs and generates an output signal 457 that indicates the result of this comparison.

Output signal 457 may take on distinct values. A first of these values indicates that power indication signal 436 is greater than $T_4$. This first value is referred to herein as "HIGH." A second of these values indicates that power indication signal 436 is less than or equal to $T_4$ and greater than $T_3$. This second value is referred to herein as "MEDIUM." A third of these values indicates that power indication signal 436 is less than or equal to $T_3$. This third value is referred to herein as "LOW."

Comparator 454 receives SNR indication signal 438 and a threshold signal 446 having a threshold value $T_2$. Comparator 454 compares these inputs and generates an output signal 459 that indicates the result of this comparison. Like output signals 455 and 457, output signal 459 may also take on distinct values. A first of these values indicates that SNR indication signal 438 is greater than $T_2$. This first value is referred to herein as "HIGH." A second of these distinct values indicates that SNR indication signal 438 is less than or equal to $T_2$. This second value is referred to herein as "LOW."

Collision detection logic module 426 receives output signals 455, 457, and 459. Based on the values of these signals, collision detection logic module 426 generates a conclusion signal 446. Conclusion signal 446 characterizes signal 420. For example, Conclusion signal 446 indicates whether signal 420 is the result of a collision (i.e., overlapping burst transmissions), a good packet (i.e., a valid burst transmission), a bad packet (i.e., a corrupted burst transmission), or an empty slot.

Table 1, below, provides an exemplary mapping of output signals 455, 457, and 459 to conclusion signal 446. In Table 1, output signal 455 indicates whether a preamble was detected in signal 420. Output signal 459 indicates the average SNR of the data portion of a burst transmission, such as unique data portion 306. Output signal 457 indicates the power of the data portion of a burst transmission, such as unique data portion 306.

TABLE 1

| Output Signal 455 | Output Signal 459 | Output Signal 457 | Conclusion Signal 446 |
|---|---|---|---|
| True | High | High | Good packet |
| True | Low | High | In-Phase Collision |
| True | High | Medium | Good packet |
| True | Low | Medium | In-Phase Collision |
| True | High | Low | Good packet |
| True | Low | Low | In-Phase Collision |
| False | * | High | Out-of-Phase Collision |
| False | * | Medium | Bad packet |
| False | * | Low | Empty slot |

As shown in Table 1, conclusion signal 446 can classify input signal 420 as either a good packet, an in-phase collision, an out-of-phase collision, a bad packet, or an empty slot. A good packet is an un-collided packet that is capable of being decoded. An in-phase collision is a collision between two or more packet conveying modulated (e.g., QPSK or QAM) signals having carrier phases that are substantially the same.

In contrast, an out-of-phase collision is a collision between two or more packet conveying modulated signals having carrier phases that are not substantially the same. A bad packet is a packet that through circumstances, such as attenuation or strong noise conditions, is received such that it cannot be decoded. An empty slot denotes the absence of a packet transmission during a time interval, such as a TDMA slot.

In Table 1, asterisks are placed in the lower three rows of the column containing output signal 459 values. These asterisks indicate "don't care" conditions. Thus, for the values of output signals 455 and 457 that correspond to these rows, output signal 459 generation is not required to produce conclusion signal 446.

The elements of receiver 400 may be implemented through various techniques, as would be apparent to persons skilled in the relevant arts. For example, these elements may be implemented through electronic circuitry, and/or digital processing techniques. Such digital processing techniques may be implemented with a general purpose microprocessor, and/or a digital signal processor (DSP).

III. Operation

Figure 6:
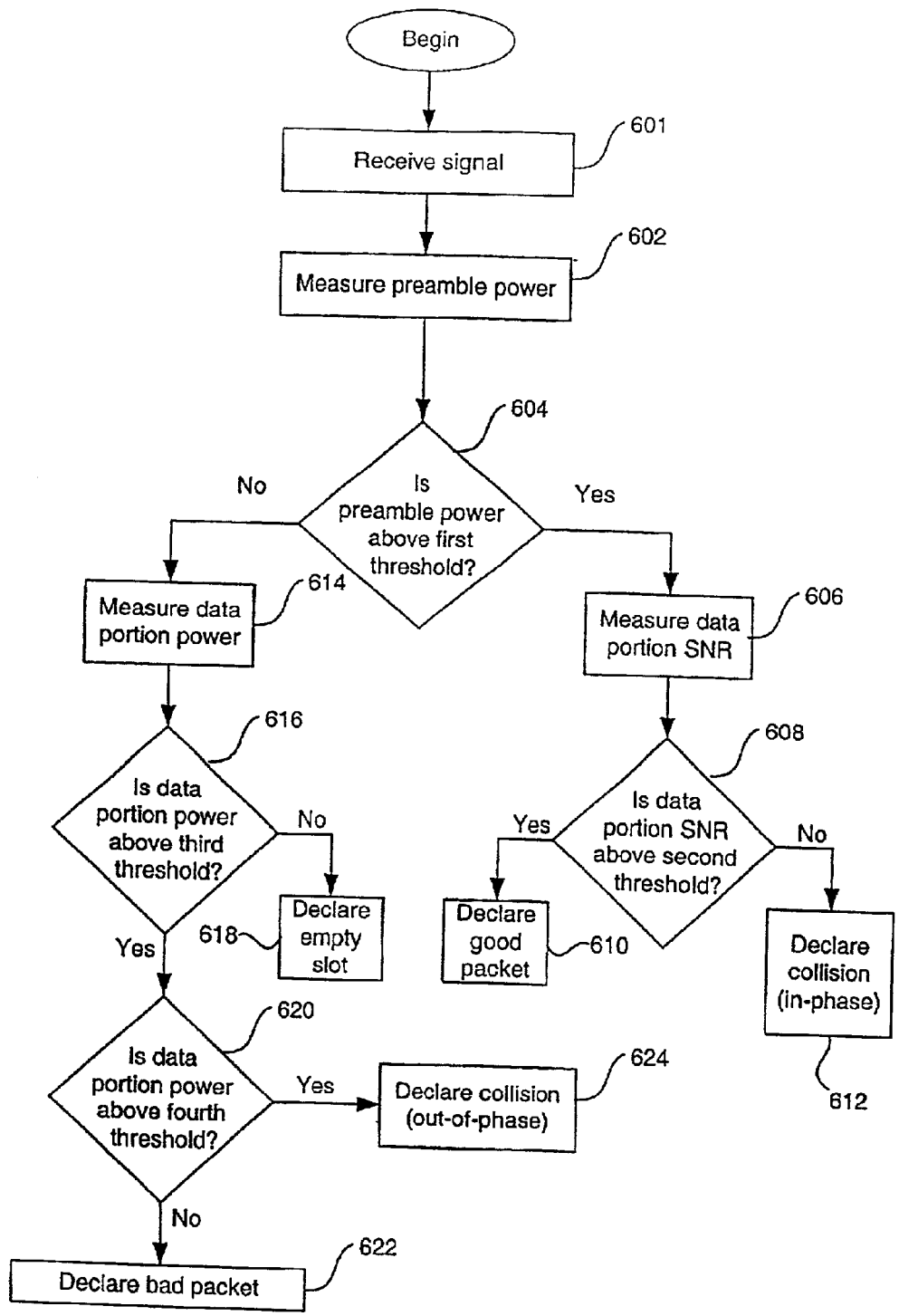
FIG. 6 is a flowchart illustrating a collision detection method.

FIG. 6 is a flowchart illustrating a collision detection method, according to the present invention. This method enables the characterization of signals received across a shared communications medium. This method begins with a step 601. In step 601, a signal is received from a shared communications medium, such as a fiber optic backbone segment 120, a fiber optic line 122, a coaxial cable 124, or a wireless or satellite channel. With reference to receiver 400, this step comprises receiving input signal 420.

In a step 602, a preamble correlation is generated from the received signal. This step comprises correlating the received signal with a predetermined preamble sequence. This correlation produces a correlation metric, such as correlation metric 434, which indicates whether the received signal includes the predetermined preamble sequence.

When performed by receiver 400, step 602 comprises generating baseband signal 428 from input signal 420 through the techniques described above with reference to FIG. 4. This step further comprises preamble detection module 414 correlating baseband signal 428 with a baseband preamble signal that corresponds to a preamble sequence in a TDMA burst, thereby generating correlation metric 434.

In a step 604, it is determined whether the preamble correlation metric is above a first threshold value, such as $T_1$. If the preamble power is greater than the first threshold value, then operation proceeds to a step 606. Otherwise, operation proceeds to a step 614. Step 604 may be performed by comparator 450.

In step 606, signal and noise content is measured. This step may comprise measuring a data portion SNR. In the context of a TDMA burst transmission, data portion SNR is an SNR measurement of transmission's data portion. For example, with reference to the exemplary reservation request 300 of FIG. 3, this data portion may be unique data portion 306 and/or identification header 304.

When performed by receiver 400, step 606 comprises generating soft decision signal 430 and data symbol sequence 432 through the techniques described above with reference to FIG. 4. This step further comprises SNR measurement module 418 calculating an SNR as described above, thereby generating SNR indication signal 438.

A step 608 follows step 606. In this step, it is determined whether the signal noise content is above a second threshold value, such as $T_2$. If the signal noise content is greater than the second threshold value, then a step 610 is performed. Otherwise, a step 612 is performed. Step 608 may be performed by comparator 454.

In step 610, the received signal is declared a good packet. With reference to receiver 400, this step may comprise collision detection logic module 426 generating a conclusion signal 446 that characterizes the received signal as a good packet.

In step 612, the received signal is declared an in-phase collision. With reference to receiver 400, this step may comprise collision detection logic module 426 generating a conclusion signal 446 that characterizes the received signal as a good packet.

As described above, step 614 follows step 604 if the preamble correlation metric generated in step 602 is less than or equal to $T_1$. In this step, a signal power is measured. This step may comprise measuring the power of a data portion. In the context of a TDMA burst transmission, data portion power is a power measurement of the transmission's data portion. With reference to the exemplary reservation request 300 of FIG. 3, this data portion may be unique data portion 306 and/or identification header 304.

When performed by receiver 400, step 614 comprises generating soft decision signal 430 through the techniques described above with reference to FIG. 4. This step further comprises power measurement module 416 generating power indication signal 436.

A step 616 follows step 614. In step 616, it is determined whether the signal power measured in step 614 is greater than a third threshold value, such as $T_3$. If so, then a step 620 is performed. Otherwise, operation proceeds to a step 618. Step 616 may be performed by comparator 452.

In step 618, the received signal is declared an empty slot. With reference to receiver 400, this step may comprise collision detection logic module 426 generating a conclusion signal 446 that characterizes the received signal as an empty slot.

In step 620, it is determined whether the signal power measured in step 614 is greater than a fourth threshold value, such as $T_4$. If so, a step 624 is performed where the received signal is declared an out-of-phase collision. With reference to receiver 400, this step may comprise collision detection logic module 426 generating a conclusion signal 446 that characterizes the received signal as an out-of-phase collision. Step 620 may be performed by comparator 452.

If it is determined in step 620 that the signal power measured in step 614 is less than or equal to the fourth threshold value, then operation proceeds to a step 622. In step 622, the received signal is declared a bad packet. Thus, with reference to receiver 400, this step may comprise collision detection logic module 426 generating a conclusion signal 446 that characterizes the received signal as a bad packet.

In embodiments of the present invention, measurements are made in both steps 606 and 614 that require the identification of data portions of TDMA burst transmissions. The data portions of these transmissions are identified with synchronization information. This synchronization information is based on a timing reference that yields the largest preamble correlation performed in step 602.

When performed by receiver 400, the operational sequence, described herein with reference to FIG. 6, provides the mapping of output signals 455, 457, and 459 to conclusion signal 446, as shown above in Table 1. This technique enables the detection of collisions with greater accuracy than conventional approaches that are based simply on power.

IV. Threshold Settings

As described above with reference to FIGS. 4 and 6, the present invention employs a plurality of thresholds (e.g., thresholds $T_1$ through $T_4$) during the characterization of signals received from a shared communications medium. Exemplary values for thresholds $T_1$ through $T_4$ are provided below. However, these threshold values are intended as examples and may be adjusted based on operating conditions. Thus, these threshold values may be take on any combination of values.

As described above with reference to FIG. 4, comparator 450 uses $T_1$ to detect the presence of a preamble in an upstream transmission. Furthermore, $T_1$ may be used in step 604 of FIG. 6. The power of received packets often varies. In the case of upstream DOCSIS transmissions, variations within a certain tolerance (e.g., +/−6 dB) of a nominal preamble correlation value yield adequate preamble detection.

The nominal preamble correlation value is a preamble correlation metric value when a packet is received at an expected power level. This expected power level is referred to herein as nominal power. A receiver, such as receiver 400, may set nominal power to a value within a predetermined power range. For example, in the case of upstream DOCSIS transmissions, nominal power for a 2.56 megasymbols per second (Msps) packet may be in the range of −4 to +26 dBmV.

Once a nominal power value is set, packets may vary within a predetermined tolerance about this value. For example, in a case where the nominal power level is set to +10 dBmV, preamble detection using a +/−6 dB tolerance will provide for preamble detection when the preamble correlation metric is between +4 and +16 dBmV. Similarly, in a case where the nominal power level is changed to +15 dBmV, preamble detection using a +/−6 dB tolerance will provide for preamble detection when the preamble correlation metric is between +9 and +21 dBmV.

Accordingly, $T_1$ may be set to a value that is substantially equal to the lower end of the preamble detection tolerance range (e.g., 6 dB below the nominal power level). Alternatively, $T_1$ may be set below the lower end of the preamble detection tolerance range (e.g., 9 dB below the nominal power level).

Comparator 454 uses $T_2$ to determine whether the data portion of the packet has adequate SNR. Additionally, $T_2$ may be used in step 608 of FIG. 6. $T_2$ may vary according to the modulation scheme employed for packet transmission. For QPSK modulation, $T_2$ may be set to 6 dB, which corresponds to the minimum SNR required for QPSK to operate. However, for 16-QAM and higher QAM, $T_2$ may be set to 9 dB, which corresponds to the minimum SNR required for QAM to operate.

$T_3$ is used by comparator 452 to discriminate between the noise floor and a packet. Also, $T_3$ may be employed in step 620. As described above, packets may have varying received power. In the case of DOCSIS, power within 6 dB of a nominal packet power level may be tolerated. Hence $T_3$ may be set to 6 dB below the nominal packet power level. Alternatively, $T_3$ may be set to a value beneath the lower end of this tolerance range. For example, in the case of DOCSIS, $T_3$ may be set to 9 dB below the nominal packet power level.

$T_4$ is also used by comparator 453 to determine whether two or more packets collide out of phase, so that their preambles cancel, but result in their combined unique portions, such as unique data portions 306 having high power. Since packets may have varying received power levels, variations (e.g., +/−6 dB in the case of DOCSIS) may be tolerated. When two minimum-power packets collide, the combined data portion power may be 3 dB below (i.e., −6 dB +3 dB) the nominal packet power level. Accordingly, $T_4$ may be set substantially equal to 3 dB below the nominal packet power level. However, $T_4$, may alternatively be set to a lower value, such as 5 dB below the nominal packet power level.

V. Capabilities

The collision detection capabilities of the present invention are described below in the context of various scenarios involving TDMA burst transmissions (also referred to herein as packets) received from a shared communications medium. In these scenarios, two or more packets arrive at overlapping times. As described herein, overlapping transmissions result in a collision.

For these scenarios, the originators of the received packets (e.g., subscribers 108) have each performed amplitude, time and frequency adjustment through a ranging process. This ranging process may, for example, be enabled through one or more TDMA maintenance slots.

Since this ranging process includes amplitude adjustment, the received packets are within a specific amplitude range. For example, the received packets may each have amplitudes that are within 3 dB of each other. However, greater amplitude offsets, such as 6 dB, may occur in certain cases. Furthermore, since the originators of these packets have performed timing adjustments, the arrival times of the received packets are within a certain threshold. For example, the packets may arrive within 0.25 symbols of each other.

Unlike amplitude levels and arrival times, the carrier phases of the received packets are generally unknown and may be considered to be random. However, TDMA packets, such as reservation request 300, are relatively short in duration. Therefore, the received packets may be considered to have constant carrier phases over their duration.

Since the arrival times of these received packets are nearly the same, but their phases are random, these packets are referred to herein as being "quasi-aligned." For these quasi-aligned packets, phase and amplitude offsets affect the detectable preamble power upon reception. However, the effect of timing offsets (e.g., within 0.25 symbols) is minor. Therefore, such minor offsets are excluded from this discussion.

In a first set of scenarios, the received packets have identical amplitudes, but various phases relative to each other. These relative phases are referred to herein as phase offsets. When the phase offset is near zero, the preambles of the received packets add coherently. This coherent addition results in the detection (e.g., by preamble detection module 414) of a more powerful preamble than if no collision had occurred.

For two exemplary received packets having identical amplitudes, their phase offset affects preamble detection in a manner that is expressed below in Equation (1). Equation (1) expresses the gain of the preamble in dB vs phase offset when two equal preambles collide. This gain is analogous to a simple mathematical model where two vectors of equal length and different phase are summed.

$$\text{gain\_dB} = 20 * \log 10(\text{abs}(2 * \cos(\text{phase\_offset\_deg}/2 * pi/180))) \quad (1)$$

Table 2, below, provides preamble power increases for corresponding phase offset values according to Equation (1).

TABLE 2

| Phase Offset Between Colliding Packets (phase_offset_deg) | Preamble Power Increase (gain_dB) |
| --- | --- |
| 0 degrees | 6.0 dB |
| 30 degrees | 5.7 dB |
| 60 degrees | 4.8 dB |
| 90 degrees | 3.0 dB |
| 120 degrees | 0 dB |
| 150 degrees | −5.7 dB |
| 180 degrees | -infinity dB |

Table 2 shows that, for two colliding packets of equal power, the detected preamble power is increased two thirds of the time (that is, for phase offset angles from 0 to 120 degrees). In fact, for one-half of the time (offset angles 0 to 90 degrees) preamble power is increased by 3 dB or more. However, for one-third of the time (offset angles 120 to 180 degrees), detected preamble power decreases.

Figure 7:
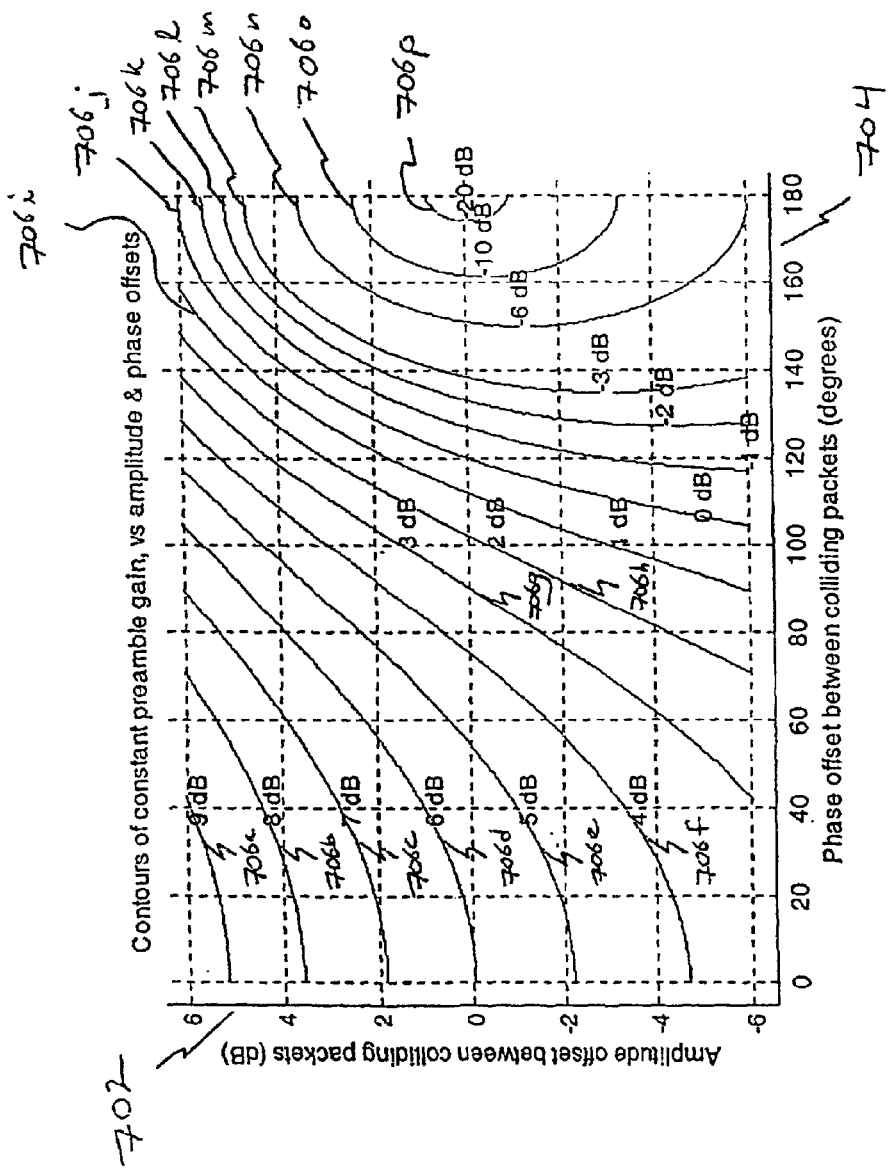
FIG. 7 is graph that shows preamble gain as a function of both amplitude offset and phase offset between two received packets.

A second set of scenarios involves the received packets having differing amplitudes and differing phases. For this set of scenarios, FIG. 7 is graph that shows preamble gain as a function of both amplitude offset 702 and phase offset 704 between two received packets. Accordingly, FIG. 7 includes contours 706 of constant preamble gain.

By scanning across the horizontal axis that corresponds to 0 dB amplitude offset in FIG. 7, the preamble gain values of Table 2 appear. However, as shown in the upper-left corner of FIG. 7, the preamble power resulting from a collision can be greater than 9 dB when the phase offset is small and the amplitude offset is large (e.g., 6 dB and greater).

In contrast to these preamble detection gains, the middle-right edge of FIG. 7 shows that the ability to detect a preamble can effectively disappear (e.g., preamble attenuation of 20 dB and greater). This trend culminates in complete destructive interference upon the occurrence of a 180-degree phase offset and a zero dB amplitude offset.

The techniques of the present invention, as described above with reference to Table 1 and FIG. 6, enable the detection of collisions with high likelihood across the entire range of phase and amplitude offsets shown in FIG. 7. As such, described below are examples involving the collision of two QPSK signals, denoted signal 1 and signal 2.

Signals 1 and 2 each convey a reservation request 300. However, signals 1 and 2 each have different unique data portions 306. QPSK signals are mathematically represented as complex signals having real and imaginary parts. However, the illustration of the combining of signals 1 and 2 provided graphically herein is with reference to only their real parts. Nevertheless, the same principles apply for their imaginary parts.

Signals 1 and 2 each include a plurality of symbols. Before scaling upon reception, the real part of these symbols may be, for example, either +1 or −1. However, after scaling (due to amplitude offsets) and phase rotation (due to phase offsets), the real part of signal 1 symbols may be either a or −a, and the real part of signal 2 symbols may be either +b or −b. Consequently, when combining signals 1 and 2, the resultant signal will have the quaternary values of a+b, a−b, b−a, and −a−b. This results in the effective randomization of the symbols of signals 1 and 2. A comparison of these quaternary symbols to the correct symbol values will generally result in a low SNR being measured.

FIGS. 8–10 are graphs showing exemplary cases involving the addition of signals 1 and 2. As shown in these graphs, signals 1 and 2, as well as their combined sums (denoted as "Sum 1+2"), are mapped to portions of reservation request 300. In these cases, signals 1 and 2 each have an SNR that is on or about 30 dB, which is a high SNR for QPSK transmission.

Figures 8A, 8B, 8C:
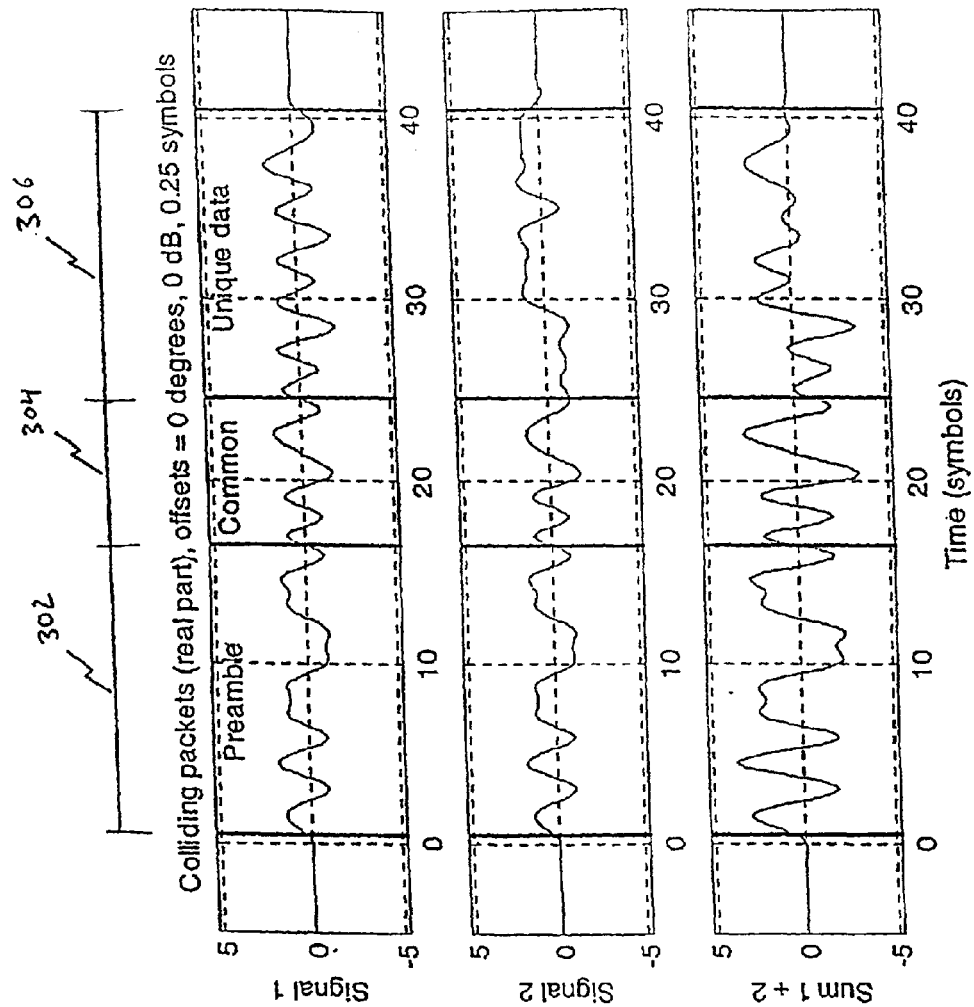

The first example, shown in FIGS. 8A–8C, illustrates signals 1 and 2 colliding with equal amplitude and phase. In particular, FIG. 8A shows signal 1, FIG. 8B shows signal 2, and FIG. 8C shows the sum of signals 1 and 2. FIG. 8C illustrates that preamble 302 and identification header 304 add coherently since they convey identical symbols. This coherent addition enables the detection of strong preamble 302 and identification header 304 portions.

In contrast with the ability to detect strong preamble 302 and identification header 304 portions, FIG. 8C shows that the interval of the sum of signals 1 and 2 that correspond to unique data portion 306 are effectively randomized. This effective randomization results in a low SNR, which may be measured by SNR measurement module 418. Normal packets (without collision) generally provide a high SNR when a strong preamble is detected. However, embodiments of the present invention detect a collision when such a low SNR is measured.

Figures 9A, 9B, 9C:
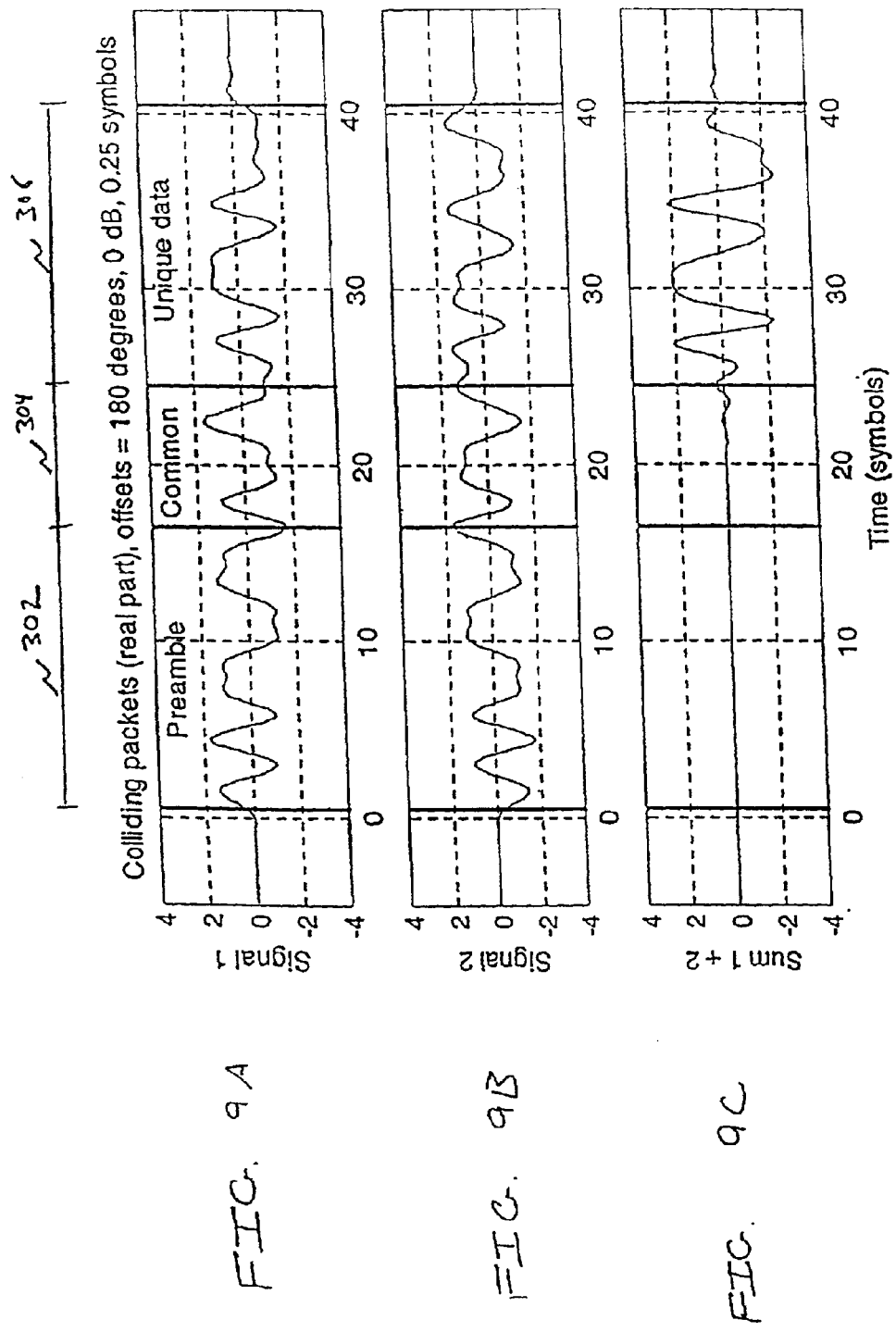

The second example, shown in FIGS. 9A–9C, illustrates signals 1 and 2 colliding with equal amplitude and opposite phase. In particular, FIG. 9A shows signal 1, FIG. 9B shows signal 2, and FIG. 9C shows the sum of signals 1 and 2. FIG. 9C illustrates that preamble 302 and identification header 304 add destructively, virtually canceling to nearly zero. In the context of receiver 400, this will result in preamble detection module 414 generating a low correlation metric 434 value.

In contrast, FIG. 9C further illustrates that unique data portion 306 remains strong. Thus, the sum of signals 1 and 2 have a high power level during unique data portion 306. In the context of receiver 400, this will result in power measurement module 416 generating a power indication signal 436 that indicates a high power level for unique data portion 306. Based on the presence of a high power level for unique data portion 306, embodiments of the present invention conclude that a collision has occurred.

Unlike the present invention, conventional approaches would conclude from the absence of preamble 302 power in FIG. 9C that no packet has been transmitted. Thus, by failing to detect a collision, such conventional approaches are unable to register accurate collision statistics.

The third example, shown in FIGS. 10A–10C, illustrates signals 1 and 2 colliding with a 3 dB amplitude offset and opposite phase. In particular, FIG. 10A shows signal 1, FIG. 10B shows signal 2, and FIG. 10C shows the sum of signals 1 and 2. FIG. 10C illustrates that preamble 302, identification header 304, and unique data portion 306 add destructively, but do not completely cancel.

As shown in FIG. 10C, unique data portion 306 of summed signals 1 and 2 remains strong. However, this portion would exhibit a low SNR because it includes "randomized" symbols. If the weak preamble (resulting from destructive addition of the two transmitted preambles) is detected, the low SNR in the unique data indicates a collision. If the preamble is so weak as to not be detected, the presence of strong energy in the unique data indicates a collision.

VI. CONCLUSION

While various embodiments of the present invention have been described above, it should be understood that they have been presented by way of example only, and not limitation.

For example, the present invention is not limited to cable modem systems. For instance, the present invention may be employed by wireless communications systems, satellite communications systems, and optical communications systems. Furthermore, the present invention may employ modulation techniques other than QPSK and QAM. In addition, the present invention is not limited to TDMA. For example, code division multiple access (CDMA) systems and orthogonal frequency division multiple access (OFDMA) system may use the present invention.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of detecting collisions in a shared communications medium, comprising:
   (a) receiving a signal;
   (b) correlating the received signal with a second signal to obtain a correlation metric;
   (c) measuring a signal to noise ratio (SNR) of the received signal when the correlation metric is greater than a first threshold; and
   (d) classifing the received signal as a collision when the SNR is less than a second threshold.

2. The method of claim 1, wherein the second signal corresponds to a predetermined preamble sequence.

3. The method of claim 1, wherein step (c) comprises measuring an SNR of a data portion of the received signal.

4. The method of claim 1, wherein step (a) comprises receiving one or more transmissions from a time division multiple access (TDMA) medium.

5. A method of detecting collisions in a shared communications medium, comprising:
   (a) receiving a signal from the shared communications medium;
   (b) correlating the received signal with a second signal to obtain a correlation metric;
   (c) measuring a signal to noise ratio (SNR) of the received signal when the correlation metric is greater than a first threshold;
   (d) measuring a power of the received signal when the correlation metric is less than or equal to the first threshold;
   (e) classifying the received signal as a collision when the measured received signal power is greater than a second threshold; and
   (f) classifying the received signal as a collision when the measured SNR is less than a third threshold.

6. The method of claim 5, further comprising classifying the received signal as an empty slot when the measured received signal power is less than or equal to the second threshold.

7. The method of claim 5, further comprising classifying the received signal as a bad packet when the measured received signal power is greater than the second threshold and less than or equal to the third threshold.

8. The method of claim 5, wherein the second signal corresponds to a predetermined preamble sequence.

9. The method of claim 5, wherein step (c) comprises measuring an SNR of a data portion of the received signal.

10. The method of claim 5, wherein step (d) comprises measuring a power of a data portion of the received signal.

11. The method of claim 5, wherein step (a) comprises receiving one or more transmissions from a time division multiple access (TDMA) medium.

12. A system for detecting collisions in a shared communications medium, comprising:
   a receive path adapted to generate a first intermediate signal, a second intermediate signal, and a data symbol sequence from an input signal;
   a preamble detection module adapted to generate a correlation metric from the first intermediate signal;
   a power measurement module adapted to generate a power indication signal from the second intermediate signal;
   a signal to noise ratio (SNR) measurement module adapted to generate a SNR indication signal from the second intermediate signal and the data symbol sequence; and
   a processing module adapted to characterize the input signal.

13. The system of claim 12, wherein the processing module is adapted to characterize the input signal as a collision when the correlation metric is greater than a first threshold and the SNR indication signal is less than a second threshold.

14. The system of claim 12, wherein the processing module is adapted to characterize the input signal as a collision when the correlation metric is less than or equal to a first threshold and the power indication signal is greater than a second threshold.

15. The system of claim 12, wherein the first intermediate signal is a baseband signal.

16. The system of claim 12, wherein the second intermediate signal is a soft decision signal.

17. The system of claim 12, wherein the input signal comprises one or more transmissions received from a time division multiple access (TDMA) medium.

18. A method of detecting collisions in a shared communications medium, comprising:
   (a) receiving a signal;
   (b) correlating the received signal with a second signal to obtain a correlation metric;
   (c) measuring a power of the received signal during a portion of the received signal;
   (d) measuring a signal to noise ratio (SNR) of the received signal during a portion of the received signal; and
   (e) classifying the received signal as a collision or a non-collision based on the logical combination of the correlation metric, the measured signal power, and the SNR.

19. The method of claim 18, wherein step (e) comprises classifying the received signal as a collision when the correlation metric is greater than a first threshold, the SNR is less than or equal to a second threshold, and the measured signal power is greater than a third threshold.

20. The method of claim 18, wherein step (e) comprises classifying the received signal as a collision when the correlation metric is greater than a first threshold, the SNR is less than or equal to a second threshold, and the measured signal power is greater than a third threshold and less than or equal to a fourth threshold.

21. The method of claim 18, wherein step (e) comprises classifying the received signal as a collision when the correlation metric is greater than a first threshold, the SNR is less than or equal to a second threshold, and the measured signal power is less than or equal to a third threshold.

22. The method claim 18, wherein step (e) comprises classifying the received signal as a collision when the correlation metric is less than or equal to a first threshold, and the measured signal power is greater than a second threshold.

* * * * *